United States Patent
Dubray et al.

(10) Patent No.: US 12,346,077 B2
(45) Date of Patent: Jul. 1, 2025

(54) SYSTEM COMPRISING A FIELD DEVICE AND A CONTROL DEVICE AND METHOD FOR OPERATING SUCH A SYSTEM

(71) Applicant: KROHNE S.A.S., Romans-sur-Isère (FR)

(72) Inventors: Olivier Dubray, Chatuzange-le-Goubet (FR); Denis Lambert, Saint Bardoux (FR); Fabrice Marcel, Saint Péray (FR); Pierre Metral, Chanos-Curson (FR); Florian Chanal, Saint Barthelemy de Vals (FR); Vincent Pichot, Romans-sur-Isère (FR)

(*) Notice: Subject to any disclaimer, the term of this patent is extended or adjusted under 35 U.S.C. 154(b) by 514 days.

(21) Appl. No.: 17/655,271

(22) Filed: Mar. 17, 2022

(65) Prior Publication Data

US 2022/0299962 A1    Sep. 22, 2022

(30) Foreign Application Priority Data

Mar. 19, 2021 (DE) .................... 10 2021 106 820.7

(51) Int. Cl.
   *G06F 15/173*   (2006.01)
   *G05B 19/042*   (2006.01)
   *H04L 67/10*    (2022.01)

(52) U.S. Cl.
   CPC ........... *G05B 19/042* (2013.01); *H04L 67/10* (2013.01); *G05B 2219/2231* (2013.01)

(58) Field of Classification Search
   CPC ......... G05B 19/042; G05B 2219/2231; G05B 2219/1215; H04L 67/10
   USPC ....................................................... 709/226
   See application file for complete search history.

(56) References Cited

U.S. PATENT DOCUMENTS

| | | | |
|---|---|---|---|
| 8,811,459 B1* | 8/2014 | Tanner | H04L 49/254 375/220 |
| 9,578,446 B2 | 2/2017 | Baret et al. | |
| 11,275,703 B1* | 3/2022 | Mishra | G06F 13/20 |
| 2010/0026518 A1 | 2/2010 | Kirst et al. | |
| 2016/0037566 A1 | 2/2016 | Jakusovszky et al. | |
| 2016/0294446 A1* | 10/2016 | Rumler | G05B 19/0423 |

(Continued)

FOREIGN PATENT DOCUMENTS

| | | |
|---|---|---|
| DE | 102008029956 A1 | 12/2009 |
| DE | 102011082002 A1 | 3/2013 |

(Continued)

*Primary Examiner* — Alan S Chou
(74) *Attorney, Agent, or Firm* — Patrick D. Duplessis

(57) ABSTRACT

A system includes a field device and a control device. The field device includes a field device controller and a field device transmitter. The control device includes a control device controller and a control device transmitter. The field device transmitter and the control device transmitter have a transmission path between them. The field device controller and the control device controller are adapted for bidirectional transmission of messages between one another according to a communication protocol via the field device transmitter, the transmission path, and the control device transmitter. The communication protocol implements the transmission of messages with a master role and a slave role. The field device controller implements the master role and the control device controller implements the slave role. A related method is also disclosed.

15 Claims, 2 Drawing Sheets

(56) References Cited

U.S. PATENT DOCUMENTS

| | | | |
|---|---|---|---|
| 2019/0116477 A1* | 4/2019 | Bhagwani | H04W 4/50 |
| 2019/0171595 A1* | 6/2019 | Mishra | G06F 13/4291 |
| 2019/0197807 A1 | 6/2019 | Kim et al. | |
| 2020/0073355 A1 | 3/2020 | Veryha et al. | |
| 2020/0177409 A1* | 6/2020 | Galchenko | H04L 12/2807 |
| 2021/0227368 A1 | 7/2021 | Krebs | |

FOREIGN PATENT DOCUMENTS

| | | |
|---|---|---|
| DE | 102017109886 A1 | 11/2018 |
| DE | 102018202176 A1 | 8/2019 |
| EP | 2981102 A1 | 2/2016 |
| WO | 2006090371 A2 | 8/2006 |

\* cited by examiner

SYSTEM COMPRISING A FIELD DEVICE AND A CONTROL DEVICE AND METHOD FOR OPERATING SUCH A SYSTEM

TECHNICAL FIELD

The invention relates firstly to a system comprising a field device and a control device, and secondly to a method for operating such a system.

BACKGROUND

In the system, the field device has a field device controller and a field device transmitter, and the control device has a control device controller and a control device transmitter. The field device and the control device are separate devices from each other.

The field device transmitter and the control device transmitter have a transmission path between them. Further, the field device controller and the control device controller are configured to bidirectionally transmit messages between one another according to a communication protocol via the field device transmitter, the transmission path, and the control device transmitter. Preferably, the communication protocol is a bus protocol. Accordingly, during operation of the system, either a message is generated by the field device transmitter and then transmitted to the control device transmitter according to the communication protocol, or a message is generated by the control device transmitter and transmitted to the field device transmitter according to the communication protocol. A message has any desired information.

The communication protocol implements the transmission of messages with a master role and a slave role. That means the communication protocol defines a master role and a slave role. If a first device and a second device implement the communication protocol and the first device implements the master role and the second device implements the slave role, then preferably only the first device can transmit a message to the second device without being requested to do so, whereas the second device can preferably transmit a message to the first device only if it has been requested to do so by the first device with a corresponding content of a message. Accordingly, the second device cannot transmit a message without being requested to do so.

Systems of the type described are known from the prior art, in which the control device controller implements the master role and the field device controller implements the slave role. Accordingly, only the control device controller can transmit an unsolicited message to the field device controller, whereas the field device controller cannot transmit an unsolicited message to the control device controller. There are several problems associated with this:

One problem is that the field device must process a message transmitted from the control device to the field device within a time frame defined in the communication protocol. Often, this time frame is so small that the resources available to the field device at that time are not sufficient to process the message within the time frame. This is because the resources of the field device are not only required for processing the message, but also for processing other tasks in the field device.

Another problem is that the control device transmits a number of messages to the field device and the resources available to the field device at that time are sufficient to process one or more of the messages but not the entire number of messages within the time frame.

A further problem is that the field device does not know a time at which a message is transmitted from the control device to the field device.

Another problem is that the control device can transmit a message to the field device without being requested. This is accompanied by a security risk, since another device can also transmit a message to the field device.

SUMMARY

An object of the present invention is to overcome or at least minimize at least one of the problems presented above in the prior art.

The object is achieved by a system according to the disclosure. According to the invention, the field device controller implements the master role and the control device controller implements the slave role.

This swapping of the master and slave roles results in several advantages:

The field device then transmits a message or a number of messages to the control device when the resources of the field device are sufficient. The times at which the field device transmits a message to the control device are known to the field device. Other devices preferably cannot transmit messages to the field device without being requested to do so. Thus, the problems described above are minimized in any case.

In practice, there can be a further transmission path between the field device transmitter of the field device and a transmission device of a further device and that the further device does not implement the communication protocol in contrast to the field device and control device. As a result, it is possible that the further device sends unsolicited messages to the field device. Therefore, the field device is preferably designed to ignore messages, in particular to ignore messages that have been sent to the field device without being requested.

In one design of the system, the transmission path is a radio transmission path. Preferably, the radio transmission path is a Bluetooth radio transmission path. Especially with radio transmission paths of prior art systems, there is a risk that another device transmits a message to the field device. This risk no longer exists with the system according to the invention.

In another design, the field device is designed to supply electrical energy via a current loop. Although the energy that can be transmitted via a current loop to supply electrical energy to the field device is low, the field device, because it implements the master role, determines the timing of transmissions of messages so that the field device avoids consuming energy in excess of the energy that can be provided by the current loop.

In a further design, the field device comprises a monitoring device. The monitoring device is designed to determine an available energy. Further, it is designed to transmit the available energy to the field device controller. The field device controller is designed to carry out a transmission of messages to the control device controller only when the available energy is greater than a predetermined minimum energy. The minimum energy is predetermined to the field device controller, for example. In this manner, it is ensured that no undersupply of electrical energy to the field device occurs during the transmission of a message, which would impair a function of the field device.

In a further embodiment of the above design, the field device includes a capacitor having a capacitance. The monitoring device is designed to determine available energy, in that the monitoring device is designed to determine an energy stored in the capacitor from a capacitor voltage and the capacitance and to determine an energy consumption of the field device. Preferably, the monitoring device is also designed to measure an input voltage and determine a charging rate of the capacitor from the input voltage to more accurately determine the available energy. The capacitor voltage drops across the capacitor.

In a further development of the above design or the above further development, a transmission energy for the transmission of messages to the control device transmitter can be specified for the field device transmitter. Thus, the transmission of a message from the field device transmitter via the transmission path to the control device transmitter is carried out by the field device transmitter with the predetermined transmission energy. It is further provided that the field device controller is designed to determine the transmission energy based on the previously determined available energy and to preset the transmission energy of the field device transmitter. Thus, the transmission energy is adapted to the respective available energy.

In a further design, the field device comprises a measuring device and the field device controller is designed to carry out a measurement with the measuring device. Preferably, the measuring device is designed to measure a temperature and/or a pressure and/or a level and/or a flow. For example, the field device measures a temperature and/or a pressure and/or a level of a medium in a container with the measuring device during operation of the field device. The field device and also the control device are in operation when the system is in operation.

In a further design, the field device controller has a working mode and a transmission mode, wherein the working mode and the transmission mode are separated in time.

That means, during operation of the field device, the field device controller is either in the working mode or in the transmission mode. Further, only the transmission mode is designed to transmit messages. The working mode is not designed to transmit messages, so only the transmission mode can transmit messages. The field device controller is designed to carry out work in the working mode that would interfere with the transmission mode, for example, because such work requires excessive electrical energy and/or requires excessive computing time. The work includes, for example, field device functions. These functions include, for example, carrying out measurements with a measuring device. Furthermore, work is carried out in the transmission mode which does not affect it. This includes reading a parameter, reading a status, changing a parameter or entering a password. However, these operations can also be carried out in the working mode. Further, the field device controller is designed to switch between the working mode and the transmission mode. Accordingly, during operation of the field device, the field device controller can independently determine whether it is operating in the working mode or the transmission mode. Preferably, the field device controller alternates between the working mode and the transmission mode during operation of the system. Thus, the working mode is always followed by the transmission mode and the transmission mode is always followed by the working mode.

If the field device has the previously described measuring device and the field device controller has the previously described working mode and transmission mode, then it is advantageous if the field device controller is designed to carry out the measurement in the working mode and to transmit messages relating to the measurement in the transmission mode. Messages relating to the measurement are, in particular, messages containing information relating to the configuration of the measurement device and messages containing information obtained from the measurement device.

If the field device controller has a working mode and a transmission mode, then it is also advantageous if a duration of the working mode and/or the transmission mode is limited. Preferably, the duration is limited to 100 milliseconds.

In another design, the field device controller has the working mode and transmission mode described previously, and the field device controller and the control device controller are formed as follows:

The field device controller is designed to generate a first message in transmission mode, and the first message has a request to transmit a task. Accordingly, during operation of the system, the first message is generated by the field device controller and then transmitted from the field device controller to the control device controller.

The control device controller is designed to generate a second message with a task in response to the first message during the transmission mode. Thus, during operation of the system, the first message is received and evaluated by the control device controller and a second message with a task is generated for the field device controller in response to the request to transmit a task. Preferably, the task is a carrying out of a measurement, a transmission of data, a reading of a parameter, a reading of a status, a change of a parameter, or an input of a password. The second message is transmitted from the control device controller to the field device controller.

The field device controller is designed to determine whether or not processing the task in the transmission mode means impairment of the transmission mode. Thus, during operation of the system, the second message is received by the field device controller and it is determined by the field device controller whether or not processing of the task in the transmission mode means impairment of the operation of the field device.

Further, the field device controller is designed to process the task in transmission mode only if it does not impair the transmission mode and to otherwise process it in working mode.

During operation of the system, the generation and transmission of the first message and the second message occur while the field device controller is in transmission mode. If the task does not impair the transmission mode, then, if a duration of the current transmission mode is still sufficient, the task is processed in the current transmission mode. If the duration is not sufficient, then the task is processed in the following working mode and/or in the transmission mode following it. If the task means an impairment of the transmission mode, then the task is processed in the following working mode. The processing of a task can thus extend over more than one working mode and/or transmission mode and does not have to take place in the current transmission mode.

In a further development of the previously described design, the field device controller and the control device controller are designed to generate and transmit multiple first messages and/or second messages during a duration of the transmission mode. By transmitting multiple first and/or second messages during the duration of the transmission mode, the transmission is more efficient than if multiple transmission modes were employed.

In a further design, the system comprises at least one further control device. In this case, the at least one further control device is designed like the control device and the field device is designed to transmit messages both with the control device and with the at least one further control device.

The object is also achieved by a method for operating a system of the type described according to the disclosure. According to the invention, in the method, the master role is implemented by the field device controller and the slave role is implemented by the control device controller.

In one embodiment, the field device controller has the working mode and transmission mode described previously, and the method has the following method steps:

The field device controller is set to transmission mode by the field device controller.

Then, a first message is generated by the field device controller with a request to transmit a task.

The first message is transmitted to the control device controller.

Then, during the transmission mode, a second message with a task is generated by the control device controller in response to the first message. The task preferably is a carrying out of a measurement, a transmission of data, a reading of a parameter, a reading of a status, a change of a parameter or an input of a password.

The second message is transmitted to the field device controller.

Then, the field device controller determines whether or not processing the task in transmission mode means impairment of the transmission mode.

From the field device controller, only if the task does not mean impairment of the transmission mode, the task is processed in transmission mode and otherwise processed in working mode.

In a further development of the above design, a plurality of first messages and/or second messages are generated and transmitted by the field device controller and by the control device controller during a duration of the transmission mode.

In a further design, it is provided that the method is carried out on a system designed according to any one of the designs and further developments described above.

In all other respects, the explanations in respect to the system apply accordingly to the method and the explanations in respect to the method apply accordingly to the system.

An alternative system also has a field device and a control device. The field device comprises a field device controller and a field device transmitter, and the control device comprises a control device controller and a control device transmitter. The field device controller and the field device transmitter have a physical communication path, and the field device controller is designed to control the field device transmitter via the communication path and to transmit information and status to the field device transmitter. The control device is, for example, an Internet-of-Things gateway or a smart phone. The field device controller and the control device controller are configured to unidirectionally transmit messages according to a communication protocol from the field device transmitter to the control device transmitter. The design for unidirectional transmission is implemented in particular by transmitting messages as broadcasts. Preferably, the transmission is a radio transmission. A communication protocol is, for example, a Bluetooth protocol. Unidirectional transmission makes it impossible to transmit messages from the control device controller to the field device controller, which improves security. The field device controller is designed to determine appropriate transmission intervals for the transmission of messages and to control the field device transmitter accordingly. For example, if the field device includes a measuring device, then a suitable transmission interval is outside of a measurement interval in which a measurement is carried out. In this manner, a transmission and a measurement are prevented from interfering with one another. Preferably, the field device controller is designed to control the measuring device. Preferably, the field device controller and the measuring device are designed to communicate via a current interface. An impairment can result, for example, in that the transmission and the measurement together require more energy than is available to the field device. For example, if the measuring device carries out the measurement using a radio measurement, for example a radar measurement, then impairment may occur between the radio measurement and the radio transmission. For example, a message includes a status and/or a measurement value. The alternative system can also comprise a plurality of field devices of the type described, which are designed to communicate with the control unit in the manner described.

BRIEF DESCRIPTION OF THE DRAWINGS

In detail, a plurality of possibilities are provided for designing and further developing the system and also the method for operating a system. For this, reference is made to the following description of preferred embodiments in connection with the drawings.

DETAILED DESCRIPTION

Figure 1:
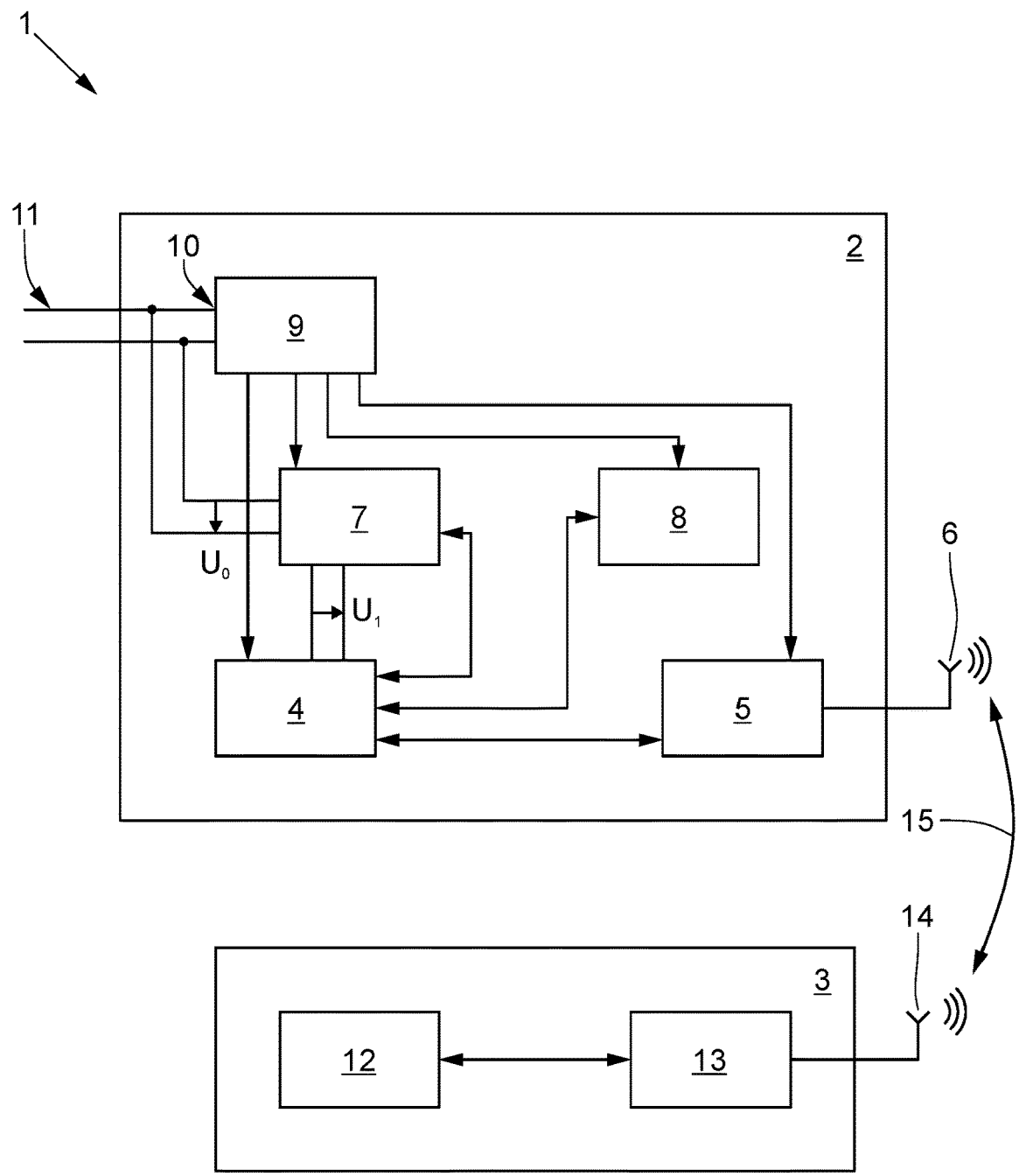
FIG. 1 illustrates an embodiment of a system.

FIG. 1 shows a system 1 with a field device 2 and a control device 3.

The field device 2 has a field device controller 4, a field device transmitter 5 with a field device antenna 6, a monitoring device 7, a measuring device 8 and a supply device 9 with a current interface 10. The current interface 10 is connected to a current loop 11. The field device controller 4 is designed to control the monitoring device 7, the measuring device 8 and the field device transmitter 5. During operation of the system 1, information is transmitted in both directions during control, which is indicated by the double arrows.

The control device 3 has a control device controller 12 and a control device transmitter 13 with a control device antenna 14.

The field device transmitter 5 and the control device transmitter 13 have a transmission path 15 between them. The transmission path 15 is a radio transmission path, namely a Bluetooth radio transmission path. Accordingly, the field device antenna 6 and the control device antenna 14 are configured for Bluetooth frequencies. Further, the field device controller 4 and the control device controller 12 are designed to bidirectionally transmit messages between one another according to a communication protocol via the field device transmitter 5, the transmission path 15, and the control device transmitter 13. A message has any desired information.

The communication protocol implements the transmission of messages with a master role and a slave role. In this embodiment, the field device controller 4 implements the master role and the control device controller 12 implements the slave role. Accordingly, only the field device controller 4 can transmit a message to the control device controller 12 without being requested to do so, whereas the control device controller 12 can transmit a message to the field device controller 4 only when it has been requested to do so by the field device controller 4 with a corresponding content of a message. The control device controller 12 cannot transmit any messages without being requested to do so.

The implementation of the master role by the field device controller 4 and the slave role by the control device controller 12 has the particular effect that the field device 2 transmits a message or a number of messages to the control device 3 when the resources of the field device 2 are sufficient for the duration of a working mode, i.e. resources are available for the processing of tasks. Further, the times at which the field device 2 transmits a message to the control device 3 are known to the field device 2. Other devices not shown here cannot transmit messages to the field device 2 without being requested to do so. This is particularly important for the radio transmission path 15.

The field device 2 is designed to be supplied with electrical energy from the current loop 11. Electrical energy is taken from the current loop 11 by the supply device 9 and this electrical energy is used to supply the supply device 9, the monitoring device 7, the measuring device 8, the field device controller 4 and the field device transmitter 5. The supply is indicated by arrows. Although the energy that can be transmitted through the current loop 11 is small, the field device 2, since it implements the master role, determines the timing of transmissions of messages and the processing of tasks, so that the field device 2 avoids consuming energy in excess of that which can be provided by the current loop 11.

The monitoring device 7 is designed to determine an available energy and to transmit the available energy to the field device controller 4. By the transmission of the available energy, information and not the transmission of the energy itself is meant. The field device controller 4 is designed to carry out transmission of messages to the control device controller 12 only when the available energy is greater than a predetermined minimum energy. The minimum energy is predetermined for the field device controller 4 in the present case. In this way, it is ensured that no undersupply of electrical energy to the field device 2 occurs during the transmission of a message, which affects a function of the field device 2.

In this embodiment, the field device 2, and specifically the field device controller 4, has a capacitor with a capacitance that is not shown separately in the figures. The monitoring device 7 is designed to determine the available energy in that the monitoring device 7 is designed to determine, on the one hand, an energy stored in the capacitor from a capacitor voltage $U_1$ and the capacitance and, on the other hand, an energy consumption of the field device 2. Here, the monitoring device 7 is also designed to measure an input voltage $U_0$ and determine a charging rate of the capacitor from the input voltage $U_0$ to more accurately determine the available energy. The input voltage $U_0$ is applied across the current loop 11.

A transmission energy for transmitting messages to the control device transmitter 13 can be specified for the field device transmitter 5. A transmission of a message from the field device controller 4 via the transmission path 15 to the control device transmitter 13 by the field device transmitter 5 thus takes place with the predetermined transmission energy.

The field device controller 4 is designed to determine the transmission energy based on the previously determined available energy and to preset the transmission energy of the field device transmitter 5. Consequently, the transmission energy is adapted to the available energy in each case.

The field device controller 4 is designed to carry out a measurement with the measuring device 8. The measuring device is designed to measure a temperature, a pressure, and a level of a medium in a container. Neither the medium nor the container are shown here.

Figure 2:
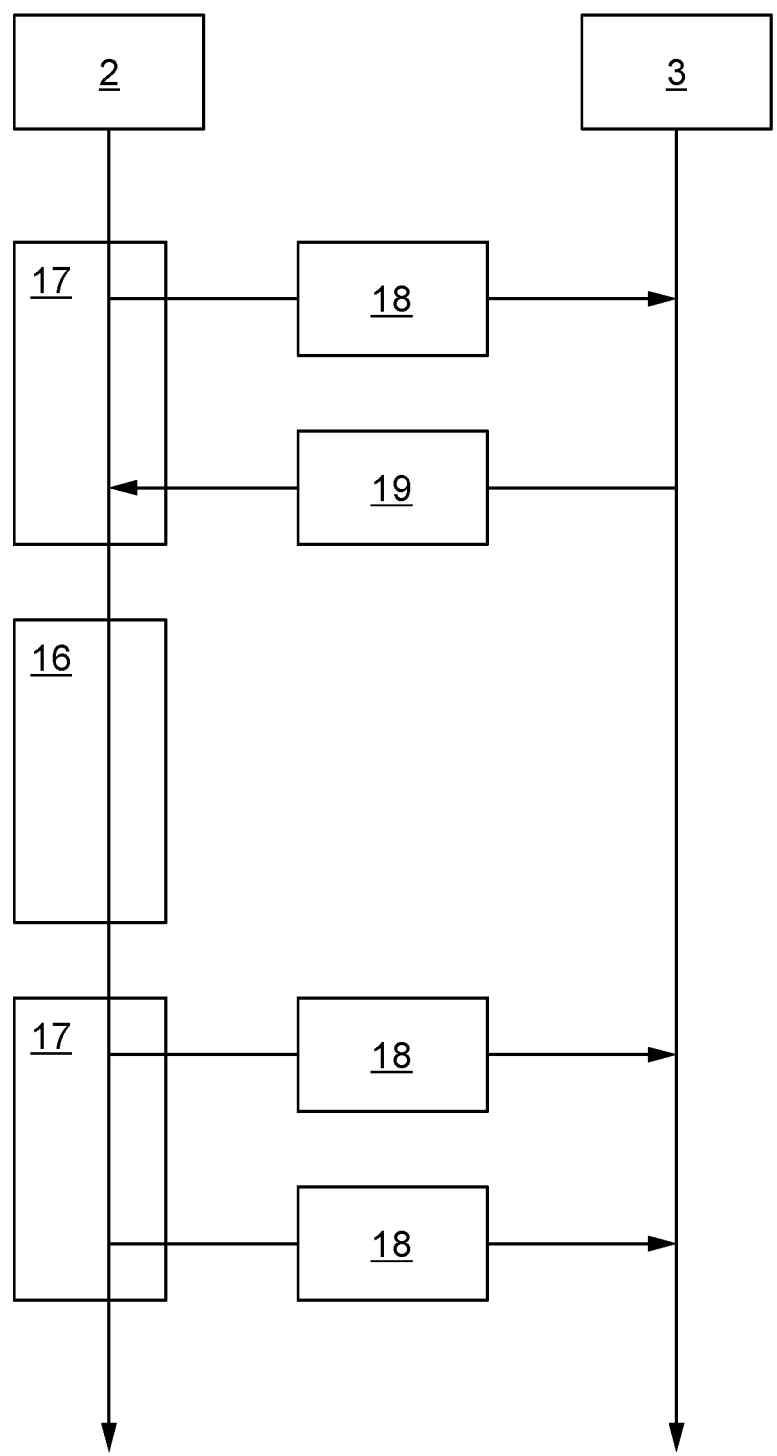
FIG. 2 illustrates a section of a flow chart of an embodiment of a method.

The field device controller 4 has a working mode 16 and a transmission mode 17, see also FIG. 2. The working mode 16 and the transmission mode 17 are separated in time. This means that during operation of the system 1, the field device controller 4 is either in working mode 16 or in transmission mode 17. Only the transmission mode 17 is designed to transmit messages. The field device controller 4 is designed to carry out operations other than transmitting messages in the working mode 16. These operations include, for example, functions of the field device 2. These functions include, for example, carrying out measurements with the measuring device 8. The field device controller 4 is also designed to switch between the working mode 16 and the transmission mode 17. Thus, during operation of the field device 2, the field device controller 4 can independently determine whether it is operating in the working mode 16 or the transmission mode 17. In this embodiment, the field device controller 4 alternates between the working mode 16 and the transmission mode 17. The field device controller 4 is designed to carry out a measurement with the measuring device 8 in the working mode 16 and to transmit messages relating to the measurement in the transmission mode 17. A duration of the working mode 16 and the transmission mode 17 is 100 milliseconds.

The field device controller 4 and the control device controller 12 are further designed as follows:

The field device controller 4 is designed to generate a first message in transmission mode 17, wherein the first message 18 comprises a request to transmit a task.

The controller control device 12 is designed to generate a second message 19 having a task in response to the first message 18 during the transmission mode 17.

The field device controller 4 is designed to determine whether or not processing the task transmission mode 17 mean impairment of the transmission mode 17.

Further, the field device controller 4 is designed to process the task in the transmission mode 17 only if it means there is no impairment of the transmission mode 17 and otherwise in the working mode 16.

During operation of the system 1, the generation and transmission of the first message 18 and the second message 19 occur while the field device controller 4 is in transmission mode 17. If the task does not impair the operation of the field device 2, then the task is processed in the operation mode 16 immediately following the transmission mode 17.

The field device controller 4 and the control device controller 12 are designed to generate and transmit a plurality of first messages 18 and second messages 19 during a duration of the transmission mode 17.

FIG. 2 shows a section of a flowchart of an embodiment of a method for operating the previously described system 1. The method has the following method steps:

The field device controller 4 is set in the transmission mode 17 by the field device controller 4.

Then, a first message 18 containing a request to transmit a task is generated by the field device controller 4.

The first message is transmitted to the control device controller 12.

Then, a second message 19 with a task is generated by the control device controller 12 during the transmission mode 17 in response to the first message 18. The task comprises measurement with the measuring device 8 and the subsequent transmission of measurement results.

The second message 19 is transmitted to the field device controller 4.

Then, the field device controller 4 determines whether or not processing the task in the transmission mode 17 means impairment of the transmission mode 17.

The field device controller 4, only if the task means an impairment of the transmission mode 17, processes the task in the following working mode 16. Since the processing of the task means an impairment of the transmission mode 17 in the present case, a measurement is carried out by the field device controller 4 with the measuring device 8 in the following working mode 16 and the measurement results of the measurement are transmitted to the control device controller 12 with two further first messages 18 in the following transmission mode 17.

The invention claimed is:

1. A system, comprising:
a field device; and
a control device;
wherein the field device includes a field device controller and a field device transmitter;
wherein the control device includes a control device controller and a control device transmitter;
wherein the field device transmitter and the control device transmitter have a transmission path between them;
wherein the field device controller and the control device controller are adapted for bidirectional transmission of messages between one another according to a communication protocol via the field device transmitter, the transmission path and the control device transmitter;
wherein the communication protocol implements the transmission of messages with a master role and a slave role;
wherein the field device controller implements the master role and the control device controller implements the slave role;
wherein the field device controller has a working mode and a transmission mode;
wherein the working mode and the transmission mode are separated in time;
wherein only the transmission mode is designed to transmit messages;
wherein the field device controller is designed to alternate between the working mode and the transmission mode; and
wherein during operation of the system, the field device controller alternates between the working mode and the transmission mode.

2. The system according to claim 1, wherein the transmission path is a radio transmission path.

3. The system according to claim 1, wherein the field device is designed to be supplied with electrical energy via a current loop.

4. The system according to claim 1, wherein the field device has a monitoring device;
wherein the monitoring device is designed to measure an input voltage and an internal supply voltage of the field device, for determining an available energy from the input voltage and the supply voltage and for transmitting the available energy to the field device controller; and
wherein the field device controller is designed to carry out transmission of messages to the control device controller only if the available energy is greater than a predetermined minimum energy.

5. The system according to claim 4, wherein the field device includes a capacitor having a capacitance;
wherein the monitoring device is designed to determine the available energy in that the monitoring device is designed to determine an energy stored in the capacitor from a capacitor voltage and the capacitance and to determine an energy consumption of the field device; and
wherein the monitoring device is designed to measure an input voltage and to determine a charging rate of the capacitor from the input voltage in order to determine the available energy more precisely.

6. The system according to claim 4, wherein a transmission energy for transmitting messages to the control device transmitter can be preset for the field device transmitter; and
wherein the field device controller is designed to determine the transmission energy on the basis of the available energy and to preset the transmission energy of the field device transmitter.

7. The system according to claim 1, wherein the field device has a measuring device;
wherein the field device controller is designed to carry out a measurement with the measuring device; and
wherein the measuring device is designed to measure a temperature and/or a pressure and/or a filling level and/or a flow rate.

8. The system according to claim 7, wherein the field device controller is designed to carry out the measurement in the working mode and to transmit messages relating to the measurement in the transmission mode.

9. The system according to claim 1, wherein a duration of the working mode and/or the transmission mode is limited to 100 ms.

10. The system according to claim 1, wherein the field device controller is designed to generate a first message in the transmission mode and that the first message includes a request to transmit a task;
wherein the control device controller is designed to generate a second message with a task in response to the first message during the transmission mode;
wherein the task includes carrying out a measurement, transmitting data, reading a parameter, reading a status, changing a parameter, or entering a password;
wherein the field device controller is designed to determine whether or not a processing of the task in the transmission mode means impairment of the transmission mode; and
wherein the field device controller is designed to process the task in the transmission mode only if it means no impairment of the operation of the field device.

11. The system according to claim 10, wherein the field device controller and the control device controller are designed to generate and transmit a plurality of first messages and/or second messages during a duration of the transmission mode.

12. The system according to claim 1, wherein the system includes at least one further control device;
wherein the at least one further control device is designed like the control device; and wherein the field device is designed to transmit messages both with the control device and with the at least one further control device.

13. A method for operating a system with a field device and a control device, wherein the field device includes a field device controller and a field device transmitter, wherein the control device includes a control device controller and a control device transmitter, wherein the field device transmitter and the control device transmitter have a transmission path between them, wherein the field device controller and the control device controller are adapted for bidirectional transmission of messages between one another according to a communication protocol via the field device transmitter, the transmission path and the control device transmitter, the method comprising:

- implementing the transmission of messages with a master role and a slave role according to the communication protocol;
- implementing the master role by the field device controller; and
- implementing the slave role by the control device controller;
- wherein the field device controller is set in a transmission mode by the field device controller;
- wherein a first message is then generated by the field device controller with a request to transmit a task;
- wherein the first message is transmitted to the control device controller;
- wherein a second message with a task is then generated by the control device controller during the transmission mode in response to the first message;
- wherein the task includes carrying out a measurement, transmitting data, reading a parameter, reading a status, changing a parameter, or entering a password;
- wherein the second message is transmitted to the field device controller;
- wherein the field device controller then determines whether or not processing the task in the transmission mode means impairment of the operation of the transmission mode; and wherein the field device controller processes the task in the transmission mode only if the task means no impairment of the transmission mode and otherwise processes the task in a working mode.

14. The system according to claim 13, wherein a plurality of first messages and/or second messages are generated and transmitted by the field device controller and by the control device controller during a duration of the transmission mode.

15. The method according to claim 13, wherein the system is designed such that at least one of:

- the transmission path is a radio transmission path;
- the field device is designed to be supplied with electrical energy via a current loop;
- the field device has a monitoring device designed to measure an input voltage and an internal supply voltage of the field device, for determining an available energy from the input voltage and the supply voltage and for transmitting the available energy to the field device controller, and the field device controller is designed to carry out transmission of messages to the control device controller only if the available energy is greater than a predetermined minimum energy;
- the field device has a measuring device, the field device controller is designed to carry out a measurement with the measuring device, and the measuring device is designed to measure a temperature and/or a pressure and/or a filling level and/or a flow rate; and
- the working mode and the transmission mode of the field device controller are separated in time, only the transmission mode is designed to transmit messages, the field device controller is designed to alternate between the working mode and the transmission mode, and during operation of the system, the field device controller alternates between the working mode and the transmission mode.

* * * * *